United States Patent [19]

Yamamoto

[11] B 3,925,179

[45] Dec. 9, 1975

[54] METHOD OF ELECTRICALLY DEPOSITING GLASS PARTICLES ON OBJECTIVE BODY

[75] Inventor: Takeshi Yamamoto, Itami, Japan

[73] Assignee: Mitsubishi Denki Kabushiki Kaisha, Tokyo, Japan

[22] Filed: Feb. 27, 1973

[21] Appl. No.: 336,345

[44] Published under the Trial Voluntary Protest Program on January 28, 1975 as document no. B 336,345.

[30] Foreign Application Priority Data

Mar. 2, 1972 Japan .............................. 47-21734

[52] U.S. Cl. .................................................. 204/181

[51] Int. Cl.² ...................... C25D 13/02; C25D 13/12

[58] Field of Search ...................................... 204/181

[56] References Cited

UNITED STATES PATENTS

| | | | |
|---|---|---|---|
| 2,321,439 | 6/1943 | Jerwey et al. | 204/181 |
| 3,163,592 | 12/1964 | Dolan et al. | 204/181 |
| 3,379,625 | 4/1968 | Csabi | 204/181 |

*Primary Examiner*—Howard S. Williams
*Attorney, Agent, or Firm*—Wenderoth, Lind & Ponack

[57] ABSTRACT

In a suspension formed of a non-ionized, conductive solvent such as a mixture of ethyl acetate and methyl alcohol and finely divided glass particles suspended in it to be negatively charged, a semiconductive wafer and an electrode are disposed in spaced opposite relationship. A dc voltage is applied across the wafer and electrode so that the wafer is positive with respect to the electrode. The negatively charged glass particles are moved toward the wafer until they adhere to it.

6 Claims, 1 Drawing Figure

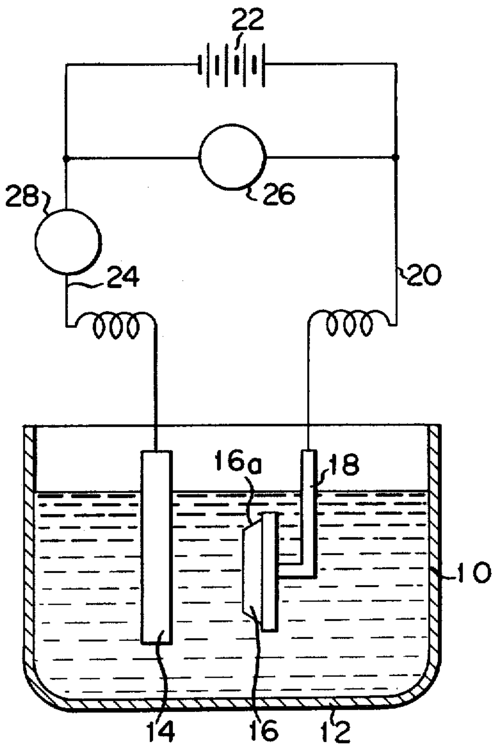
22
26
28
24
20
16a
18
10
14
16
12

METHOD OF ELECTRICALLY DEPOSITING GLASS PARTICLES ON OBJECTIVE BODY

BACKGROUND OF THE INVENTION

This invention relates to a method of electrically depositing glass particles to an objective body, for example, a surface of a wafer of semiconductive material.

If electrical components such as semiconductor elements have the exposed surface contaminated with harmful substances from external sources then the electrical characteristics thereof can be frequently deteriorated. Even though the surfaces of the electrical components are not contaminated, the electrical characteristics thereof may be deteriorated due to the effects of harmful substances thereupon. In order to prevent the electrical characteristics of the electrical components from being deteriorated by such harmful substances, it has been commonly practiced to cover the surfaces of the electrical components with layers of a passive material. Examples of such layers have heretofore involved those formed of silicon oxide, silicon nitride, oxides of metals, organic componds etc. Also it is known to form the passive layer of a non-porous glass film of uniform thickness. Such a non-porous glass film may be formed by the steps of applying glass particles to a surface of an objective body and heating the glass particles applied to the surface to fuse them in a non-porous glass film of uniform thickness thereby to stick the glass film to the surface of the objective body. The non-porous glass film thus formed provides an effective surface protective layer characterized in that, by adjusting the composition of the glass particles, it is possible to render the coefficient of thermal expansion thereof equal to that of the material of the particular objective body, for example, of a semiconductive wafer, to form sufficiently thick glass films, to render the resulting films dense and to prevent external gaseous molecules from entering the glass films and so on.

One method of forming, non-porous glass films as above described is described and claimed in Japanese Pat. No. 446,243. According to the cited patent, the step of applying glass particles to a surface of an objective body utilizes the centrifugal force. More specifically, the objective body is placed in a suspension having glass particles suspended therein and a centrifugal force of from 1,000 to 2,000 G is applied to the surface of the body in a direction normal thereto to deposit the glass particles on the surface of the body. Then the deposited glass particles on the body are subject to a suitable heat treatment to form a non-porous uniform glass film.

The method of forming glass film as above described is effective for applying the glass particles to the simple flat surface of objective bodies but is not very effective for objective bodies including, in addition to the flat surface, at least one sloping surface tilted at a some angle to the flat surface or including concave and/or convex surfaces. That is, the glass particles can not be deposited in a sufficient amount on the sloping surface or irregular peripheral wall surface.

Upon carrying out the method of forming glass films as above described, what is most important is the step of applying the glass particles to the surface of objective bodies. If the glass particles have been unevenly deposited on the particular objective body, that portion thereof having an insufficient amount of the glass particles adhering thereto can not form a glass film of sufficient thickness after heat treatment. That is a defective passive layer results.

SUMMARY OF THE INVENTION

Accordingly it is an object of the present invention to provide a new and improved method of electrically depositing glass particles in a sufficient amount on the entire surface to be deposited of an objective body even though the surface includes, for example, sloping, concave and convex portions.

The present invention accomplishes this object by the provision of a method of electrically depositing glass particles on an objective body, comprising the steps of disposing an objective body and an electrode in spaced opposite relationship within a suspension having glass particles suspended therein, the suspension having the property that the suspended glass particles are charged with a predetermined polarity, and applying a dc voltage across the objective and the oposite electrode so as to impart to the objective object a polarity opposite to the polarity with which the glass particles are charged.

Preferably the suspension may include a non-ionized, electrically conductive organic solvent having the property that the suspended glass particles are charged with the negative polarity and the objective body is maintained at a positive potential.

The non-ionized, electrically conductive solvent may be advantageously composed of a first organic solvent to which the glass particles are lyophobic mixed with a second organic solvent to which the glass particles are lyophilic.

The first solvent may be selected from the group consisting of ethyl acetate, butyl acetate and acetone.

The second solvent may be selected from the group consisting of methyl alcohol, ethyl alchol and isopropyl alcohol.

BRIEF DESCRIPTION OF THE DRAWING

The present invention will become more readily apparent from the following detailed description taken in conjunction with the accompanying drawing in which a single FIGURE is a schematic view of an apparatus suitable for use in electrically depositing glass particles on a surface of an objective body in accordance with the principles of the present invention.

DESCRIPTION OF THE PREFERRED EMBODIMENT

The present invention utilizes the cataphoresis well known in the art and is based upon the phenomenon that glass particles suspended in a suspension are charged with a predetermined polarity. An objective body on which it is intended to deposit glass particles is disposed in the suspension and a dc voltage having a polarity opposite to the polarity with which the glass particles are charged is applied to the body. This measure permits the charged glass particles to be moved through the suspension toward the objective body until the glass particles are deposited thereon.

Thus the present invention does not utilize the electrolysis of a solvent and is inherently different from electrical deposition by electrolysis.

Referring now to the drawing, it is seen that an arrangement disclosed herein comprises a vessel 10 having charged therein an amount of a suspension 12 including finely divided glass particles as will be described in detail hereinafter, an electrode of any suitable electrically conductive material, for example, tantalum immersed in the suspension 12, and an objective body 16 on which the glass particles are to be deposited. While the objective body 16 may be any electrical component it is assumed only for purposes of illustration that the body 16 is a wafer of semiconductive material such as a silicon wafer suitable for use as a power thyristor or a power diode including at least one p-n junction therein. The wafer 16 is held by a holding electrode 18 of any suitable electrically conductive material, so as to be immersed in the suspension 12 in spaced opposite relationship with the electrode 14.

As shown, the holding electrode 18 is electrically connected by a lead 20 to a source 22 of variable dc voltage at the positive terminal while the electrode 14 is electrically connected by a lead 24 to the negative terminal of the source 22. A voltmeter 26 is connected across the source 22 and a micro-ammeter 28 is connected in the lead 24.

The suspension 12 is formed of a non-ionized, electrically conductive solvent having finely divided glass particles suspended to a predetermined consistency therein. By the term "non-ionized electrically conductive solvent" is meant any electrically conductive solvent including a non-ionized conductor. The non-ionized electrically conductive solvent used with the invention is typically an organic solvent including a mixture of a first organic solvent to which the glass particles are lyophobic and a second organic solvent to which the glass particles are lyophilic, having an appropriate proportion. The first solvent is at least one organic solvent selected from the group consisting of ethyl acetate, butyl acetate and acetone while the second solvent is at least one organic solvent selected from the group consisting of methyl alcohol, ethyl alcohol, and isopropyl alcohol.

Preferred examples of the non-ionized, electrically conductive solvent involves a mixture including from 95 to 90% by volume of ethyl acetate and from 5 to 10% by volume of ethyl alcohol, and a mixture including from 95 to 90% by volume of ethyl acetate and from 5 to 10% by volume of methyl alcohol.

The glass particles may be of any suitable finely divided glass and it has been found that satisfactory results are obtained with the use of finely divided glass of the types "IP540," "IP720" or "IP820" marketed by the Innotech Co. Such types of glass particles include $SiO_2$, PbO and $Al_2O_3$ and normally have a particle size of from 30 to 20 microns or less. As an example, the glass particles have been subject to a decantation to be concentrated into particle sizes of 5 microns and less. Then the glass particles thus concentrated have been suspended in the non-ionized, electrically conductive solvent as above described.

The glass particles suspended in the non-ionized conductive solvent as above described are electrically charged due to their contact with the solvent. It has been experimentally found that the finely divided glass particles in the suspension are negatively charged regardless of the particular combination of the first and second solvents as above described. Although the mechanism whereby the glass particles are electrically charged has not been exactly understood at present it is believed that the charging of the glass particles will be caused from the phenomenon similar to the frictional electricity developed between dissimilar electrically insulating materials due to frictions occurring therebetween.

It has been found that the first organic solvent contributes to the charging of the glass particles. The first solvent has the property that it has less affinity to the glass particles, tending to increase the friction between the same and glass particles. However, the first organic solvent has the property that it causes cohesion of the glass particles, tending to precipitate them. On the contrary, the second organic solvent, to which the glass particle are lyophilic, does not contribute to the charging of the glass particles but functions to prevent the cohesion of the glass particles, tending to disperse them in the solvent.

In the example illustrated it has been assumed that the objective body 16 is a wafer of semiconductive material such as silicon including at least one p-n junction therein. The wafer 16 includes an exposed portion thereof to which the glass particles are applied and having the semiconductive material laid directly thereon. Thus the wafer 16 is shown in the drawing as including a flat surface disposed in substantially parallel relationship with the surface of the opposite electrode 14 and a sloping peripheral surface **16*a* tilted at a some angle to the flat surface. Both the flat and sloping surfaces are to receive the glass particles and are directly contacted by the suspension 12.**

If the exposed surface of the wafer includes that portion where the glass particles are not required to be applied then such surface portion can be preliminarily coated with a film of any suitable electrically insulating material such as $SiO_2$ or $Si_3N_4$ formed by thermal oxidation or pyrolysis, respectively. This insulating film is effective for preventing the glass particles from adhering to that surface portion disposed thereunder.

In operation, the source 22 of dc voltage maintains the semiconductive wafer 16 at a positive potential sufficient to attract the negatively charged glass particles toward the wafer acting as an anode electrode until the glass particles adhere to the wafer. To this end, an electric field established between the wafer and the opposite electrode 16 and 14 respectively should be a suitable strength by properly selecting the dc voltage across the source 22 and/or a distance between the wafer and opposite electrode 16 and 14 respectively. It has been found that the strength of the electric field should range from 100 to 500 volts per centimeter for satisfactory results. In the example illustrated, the distance between the wafer and opposite electrode 16 and 14 respectively was set to range from 5 to 30 millimeters and the voltage across the source 22 was adjusted to be of from 250 to 400 volts. However, it is to be understood that the present invention is not restricted to the figures just specified for the distance and voltage and that the distance and voltage may be varied so long as the strength of the electric field established between the wafer and opposite electrode is of the figure as above specified.

The source 22 applies, through the lead 20 and the holding electrode 18 to the exposed wafer surface, a higher potential than that at the opposite electrode sufficient to establish therebetween an electric field whose strength ranges from 100 to 500 volts per cm so that the negatively charged glass particles in the suspension 12 are permitted to be attracted by the exposed surface of the wafer 16 until the particles uniformly adhere thereto.

During the adhesion of the glass particles to the exposed wafer surface, the suspension 12 can be slowly stirred. This effectively prevents the glass particles from precipitating in the suspension resulting in the glass particles very uniformly adhering to the exposed surface of the wafer 16. If the glass particles have been caused to be insufficiently deposited on any portion of the exposed wafer surface, then the electric field around that surface portion will increase in strength as compared with that portion of the wafer surface having a sufficient deposit thereon. Thus the glass particles are deposited in greater numbers on the surface portion of the wafer deficient in deposition than on the remaining surface portion thereof, until the glass particles are deposited to a uniform thickness on the surface of the wafer.

It has been found that the present invention is effective for uniformly depositing the glass particles not only on a flat portion of an exposed surface of a semi-conductive wafer but also on sloping portions thereof tilted to the flat surface portion such as the sloping surface 16*a*, and irregular peripheral surface thereof.

The glass particles have a deposition speed (which corresponds to a thickness of the glass particles adhering to the surface of the wafer per unit time) which decreases as the layer of deposited glass particles increase in thickness. This is because the electric field decreases in strength with an increase in thickness of the deposited glass particles.

When the glass particles have been deposited to a predetermined thickness on the surface of the wafer 16, the source 22 is disconnected from the electrodes 14 and 18 whereupon the operation of depositing the glass particles on the wafer is stopped. Then the wafer 16 is removed from the suspension 12.

In a following step, the wafer 16 is subject to heat treatment well known in the art. The heat treatment is to fuse the glass particles deposited on the wafer to form a non-porous glass layer thereon as well as increasing the adhesion of the glass to the wafer.

In order to determine the thickness of the deposited glass particles, one can utilize a leakage current flowing from the source 22 through the suspension 12. More specifically, the source 22 can cause a very low leakage current to flow through the suspension although the suspension is very high in electric resistance because the suspension does not include ions. The leakage current decreases with an increase in thickness of the glass particles deposited on the wafer. Thus the thickness of the deposited glass particles can be indirectly determined by sensing a corresponding leakage current.

As an example, 0.1 gram of glass particles having particles sizes of 5 microns and less such as above described was suspended in 300 c.c. of a suspension formed of a non-ionized electrically conductive solvent including ethyl acetate and methyl alcohol as above described. Experiments were conducted with the arrangement as shown in the drawing including the suspension thus prepared. Upon applying a voltage from the source 22 across the wafer and opposite electrode 16 and 14 respectively to establish an electric field of 100 volts per cm thereacross within the suspension 12, an initial leakage current flowing through the suspension measured 19 microamperes. Ten minutes after the application of the voltage, the corresponding leakage current decreased to a value of 14.5 microamperes. At that time, the thickness of deposited glass particles on the wafer 16 measured 16 microns after the wafer was heat treated. When 5 minutes further lapsed or after a total time interval of 15 minutes, the corresponding leakage current decreased to 13 microamperes and the resulting thickness of the deposited glass particles measured 20 micron after the heat treatment.

From the foregoing it is apparent that a reading on the ammeter 28 provides a measure of the thickness of glass particles deposited on the wafer 16 provided that the composition of the suspension, the dispersion density of the glass particles in the suspension, and the type and configuration of the wafer and opposite electrode remain unchanged while the spacing between the wafer and opposite electrode and the voltage across the source are maintained at the same values respectively.

The present invention has several advantages. For example, glass particles can be uniformly deposited even on a sloping surfaces and curved surfaces of wafers as above described. Even if the suspension would includes ions of metals as impurities, such ions are prevented from adhering to the wafer because the metallic ions have a positive polarity and are captured by the electrode 14 which is at a negative potential. For semiconductive wafers, such metallic ions when stuck to the wafers, impede the electric characteristics of the resulting semiconductor elements. Therefore in this respect, the present invention is very advantageous. Also as above described, an electrically insulating coating formed on a predetermined portion of a surface of a semiconductive wafer serves to prevent glass particles from adhering to that surface portion. That is, the glass particles can be selectively deposited on the wafer. In this respect the present invention is important.

While the present invention has been illustrated and described in conjunction with a single preferred embodiment thereof it is to be understood that various changes and modifications may be resorted to without departing from the spirit and scope of the invention. For example, the present invention is equally applicable to a variety of electrical components other than semiconductive wafers disclosed herein.

What is claimed is:

1. A method of electrically depositing glass particles on a semiconductive body, comprising the steps of disposing the semiconductive body and an electrode in spaced relationship within a suspension having glass particles suspended in a non-ionized electrically conductive solvent consisting essentially of a first organic solvent to which the glass particles are lyophobic and a second organic solvent to which the glass particles are lyophilic, said suspended glass particles being negatively charged by said solvent, and applying a dc voltage across said semiconductive body and said electrode such that said semiconductive body has a positive polarity.

2. An electrical deposition method as claimed in claim 1, wherein said first organic solvent is selected from the group consisting of ethyl acetate, butyl acetate and acetone.

3. An electrical deposition method as claimed in claim 1, wherein said second organic solvent is selected from the group consisting of methyl alcohol, ethyl alcohol and isopropyl alcohol.

4. An electrical deposition method as claimed in claim 1, wherein said non-ionized electrically conductive solvent is a mixture including from 90 to 95% by volume of ethyl acetate and from 10 to 5% by volume of ethyl alcohol.

5. An electrical deposition method as claimed in claim 1, wherein said non-ionized, electrically conductive solvent is a mixture including from 90 to 95% by volume of ethyl acetate and from 10 to 5% by volume of methyl alcohol.

6. An electrically deposition method as claimed in claim 1, wherein said dc voltage has such a magnitude that said dc voltage establish an electric field having a strength of from 100 to 500 volts per centimeter across said objective body and said opposite electrode.

* * * * *